Patented Oct. 4, 1938

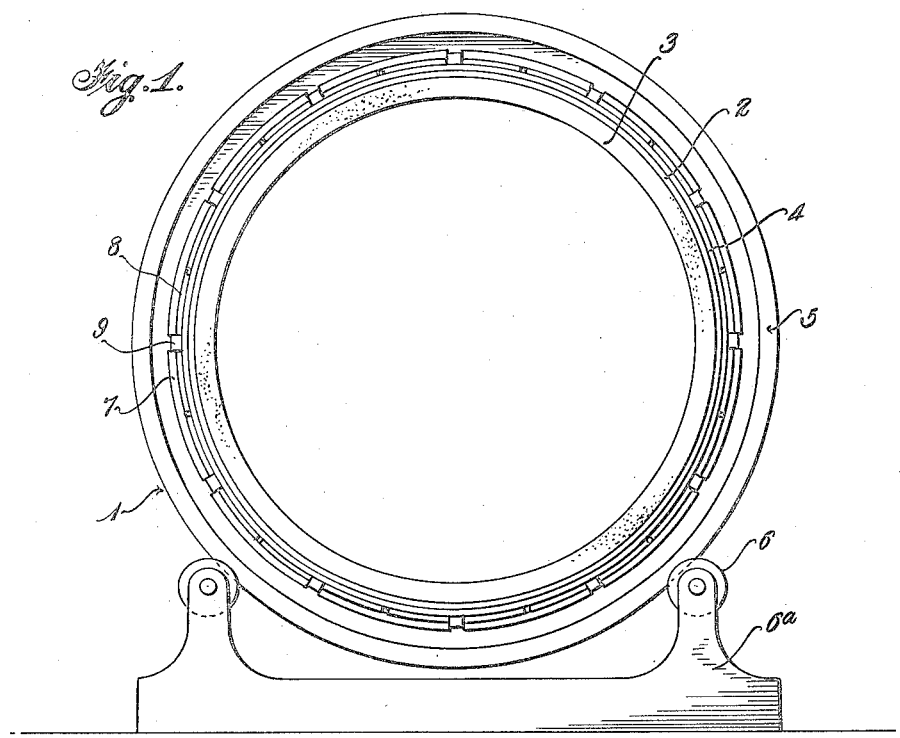
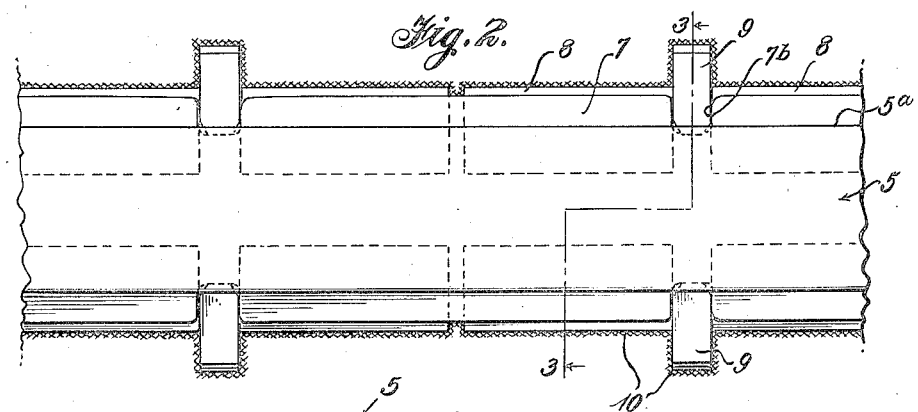
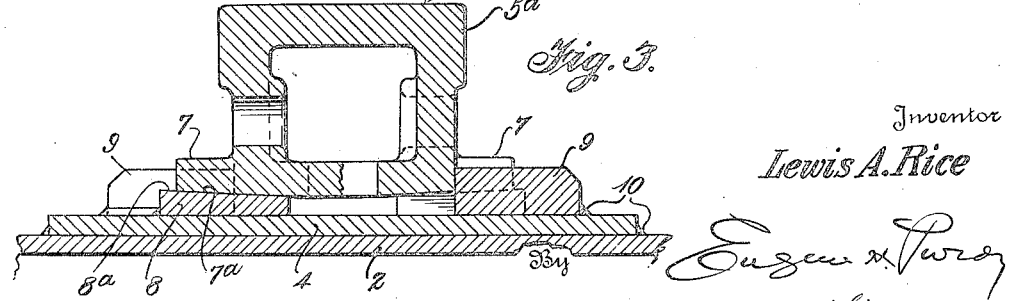

2,132,321

UNITED STATES PATENT OFFICE 2,132,321

TIRE FASTENING FOR KILNS AND THE LIKE

Lewis A. Rice, Allentown, Pa., assignor to Traylor Engineering and Manufacturing Company, Allentown, Pa., a corporation of Delaware Application April 12, 1938, Serial No. 201,564

2 Claims. (Cl. 308—204)

This invention relates to rotary kilns or coolers of the general type adapted to be floatingly supported at spaced locations intermediate their ends upon rollers engaging metal tires, or riding rings, extending about the circumference of the kiln. More particularly the invention relates to tire fastenings for such apparatus.

In the past it has been common practice to rivet such tires directly to the cylindrical shell of the kiln or cooler. Due, however, to differential expansion between the tire and shell, accompanied by a certain amount of distortion of the shell or the tire, or both, the rivets frequently pull out or shear off causing looseness to develop between the tire and shell. Rotation of the shell in its thus loosened state causes rapid wear in the area where the tire presses against the shell and unless the trouble is promptly repaired the play between the tire and the shell increases and the latter eventually becomes so lopsided as to cause the fire-brick lining within its interior to crumble and break away from the shell.

It is an object of my invention to provide a rotary kiln or cooler of the character mentioned above which overcomes the above objections by insuring a tight fit between the tire and the shell. More particularly this object is attained by providing a tire adapted to be held in tight engagement with the circumference of the shell by means of a series of segmental wedges interposed between the tire and the shell and a plurality of anchor blocks welded to the shell and abutting the ends of the wedges.

In accordance with the preferred form of my invention the segmental wedges and anchor blocks are each provided at equidistantly spaced intervals about the periphery of the shell and welded to the shell.

Other objects and advantages will become apparent from the following detailed description of the invention, reference being had to the annexed drawing in which:

Figure 1 is a transverse cross-sectional view of a rotary kiln showing one of the tires encircling the shell;

Figure 2 is a plan view of a portion of the tire shown in Fig. 1 illustrating the manner in which it is attached to the kiln; and Figure 3 is an enlarged cross-sectional view through the tire taken on the lines 3—3 of Fig. 2.

The kiln 1 shown in Fig. 1 is of the general type employed for production of cement clinker in the manufacture of Portland cement and comprises a cylindrical shell 2 having an inner lining 3 of refractory material such as fire-brick. Extending about the shell and welded to its circumference is a strap 4. Also surrounding the shell and overlying the strap but being of somewhat larger diameter than the latter, is a tire 5, this tire resting upon rollers 6 carried in a suitable cradle 6a. The tire and rollers are provided at spaced intervals along the length of the shell. As the kiln is rotated through suitable mechanism, the rollers 6 travel upon the tread of the tire 5 and aid in supporting the weight of the kiln.

Each tire, as shown in greater detail in Figs. 2 and 3, comprises a hollow riding ring 5a of rectangular cross-section, having laterally projecting flanges 7 coextensive with its inner diameter. The inner circumference of the ring is beveled as indicated at 7a, from adjacent the medial line of the ring outwardly and oppositely at a uniform pitch toward its outer edges. To take up the clearance between the ring and the strap, segmental wedges 8 are provided. These segmental wedges correspond to the curvature of the shell and have their upper faces 8a disposed at a slope corresponding to the inclination of the inner face of the tire. Thus by spacing the wedges about the circumference of the kiln and driving them from opposite sides of the ring into the space between the ring and the strap, a tight jam fit of the ring upon the shell is obtained.

The ends of the series of wedge blocks extending about the shell are separated by a small space and into alternate of these spaces are snugly fitted anchor blocks 9. The anchor blocks are arranged in pairs so as to fit within notches 7b formed in the flanges 7 at opposite sides of the ring and the opposed ends of adjacent wedges 8 abut these blocks as best shown in Fig. 2. The anchor blocks project beyond the lateral edges of the segmental wedges and the exposed marginal edges of the wedges as well as the outer marginal edges of the anchor blocks are welded to the strap 4, as indicated at 10, to rigidly retain these members in place. The riding ring 5a may be hollow throughout its length with lateral openings as indicated in Fig. 3, to reduce the weight of the ring as well as to prevent it from overheating.

It will be apparent from the above description that the anchor blocks 9 engaging notches upon opposite sides of the riding ring 5a act to prevent lateral and angular displacement of the ring and, by reason of engaging the ends of the segmental wedges 8, resist any tendency for the latter to slip circumferentially relative to the strap 4.

By virtue of my invention a rigid and positive connection of the tire to the kiln is obtained which will remain tight throughout an indefinite period of operation of the kiln. Consequently the laborious task of refitting the tires to the kiln whenever looseness occurs, or alternately assuming the risk of damage to the kiln by continuing it in service despite its faulty condition, are entirely eliminated.

Manifestly the tire fastening of my invention is not limited in its application to rotary kilns but is adaptable for use in connection with other types of rotary apparatus, such for example as rotary coolers, driers and the like.

It will be apparent that various changes in structure and design in the preferred form of the tire fastening described above may be made without departing from the spirit of my invention.

I claim:

1. A tire fastening for rotary shells of the type adapted to be supported intermediate their ends upon rollers, said tire fastening comprising a riding ring surrounding the shell and of slightly greater diameter than the diameter of the shell, and a series of segmental wedges extending into the space between the riding ring and shell to take up the clearance therebetween, said segmental wedges being circumferentially spaced about the shell and having inclined bearing surfaces cooperating with complementary inclined bearing surfaces upon the inner circumference of the riding ring, and a plurality of anchor blocks rigidly fastened to the shell engaging opposite sides of the riding ring and providing abutments for the ends of adjacent segmental wedges, whereby to prevent lateral displacement of the tire and circumferential shifting of the segmental wedges.

2. A tire fastening for rotary shells of the type adapted to be supported intermediate their ends upon rollers, said tire fastening comprising a strap extending about and secured to the circumference of the shell so as to form a unitary part of the shell, a riding ring surrounding the shell and overlying the strap and being of slightly greater diameter than the outside diameter of the strap, a series of segmental wedges extending into the space between the riding ring and the strap to take up the clearance therebetween, said segmental wedges being circumferentially spaced about the strap and having tapered bearing surfaces cooperating with tapered bearing surfaces upon the inner circumference of the riding ring, and anchor blocks engaging notches in the ring and the ends of adjacent segmental wedges to positively retain the ring and the wedges against displacement relative to the strap.

LEWIS A. RICE.